United States Patent Office 3,576,926
Patented Apr. 27, 1971

3,576,926
SOLVATION METHOD FOR MANUFACTURING HIGH STRENGTH CASELESS CARTRIDGES
John J. O'Mara, Flander, N.J., assignor to Hercules Incorporated, Wilmington, Del.
No Drawing. Filed Mar. 28, 1968, Ser. No. 717,001
Int. Cl. C06b 21/02
U.S. Cl. 264—3
12 Claims

ABSTRACT OF THE DISCLOSURE

Caseless cartridges of high physical strength are prepared by controlled solvation of smokeless powder with a solvating solution. The solvating solution is a mixture of a solvent for the smokeless powder and a non-aqueous carrier liquid which is miscible with the solvent but is a non-solvent for smokeless powder.

This invention relates to a method of molding of high strength caseless cartridges from smokeless powder employing controlled solvation of the smokeless powder with a solvating solution.

Propellant charges and in particular, caseless cartridges have been prepared from smokeless powder by various molding methods. In one prior art method, caseless cartridges have been made by compressing dry granulated smokeless powder and then solvent dipping or coating the cartridge to harden its surface. Cartridges produced by this method have suitable surface strength but the overall strength of the round is very poor, resulting in frequent breakage of the cartridge. Another approach in the manufacture of caseless cartridges, involves compressing granular smokeless powder in the presence of binder solutions prepared from binders of nitrocellulose, epoxies, or various plasticizers, whereby the binder solution bonds the smokeless powder granules together. Cartridges produced by this method have not been completely satisfactory due to encapsulation of the propellant granules which often results in a failure of the cartridge to breakup on initiation of the primer and burn as a granular propellant charge. Furthermore, the binder acts as a deterrent coating making ignition of the cartridge difficult. The binder also changes the composition of the resulting caseless cartridge. Still another method known in the art for molding of smokeless powder granules involves contacting smokeless powder with an aqueous solvating solution. Cartridges produced employing this method are too weak, to withstand normal handling operations required of ammunition without excessive physical damage to the cartridge.

It is an object of this invention to provide a method for producing caseless cartridges which have sufficient physical strength to withstand normal handling operations and temperature extremes required of ammunition without damage to the cartridge and, which will break-up upon ignition of a primer to burn as a granular propellant charge.

It is another object of this invention to provide a method for fabricating caseless cartridges which have reliable ballistic reproducibility.

It is a further object of this invention to provide a method for making caseless cartridges from smokeless powder wherein the resulting caseless cartridge is of the same composition as the smokeless powder from which it is made.

Other objects of this invention will in part, be obvious and will in part, appear hereinafter. For a complete understanding of the nature and objects of this invention, reference is made to the following detailed description.

Broadly, in accordance with this invention, there is provided a method for fabrication of caseless cartridges which comprises wetting granules of smokeless powder with a solvating solution, compressing the wetted smokeless powder into the desired shape whereby an agglomeration of smokeless powder granules is formed, drying the agglomeration of smokeless powder granules and recovering a caseless cartridge.

The solvating solution which is employed to wet the smokeless powder granules is comprised of a solvent for the smokeless powder, and a non-aqueous carrier liquid which is miscible with the solvent for the smokeless powder but which is a non-solvent for smokeless powder. Controlled solvation is achieved through wetting the smokeless powder with the solvating solution.

Suitable solvents for the smokeless powder include acetone, methyl ethyl ketone, isopropyl methyl ketone, diethyl ketone, propyl methyl ketone, isobutyl methyl ketone and the like. Mixtures of two or more of the above solvents can be employed, if desired.

Suitable non-aqueous carrier liquids which are miscible with the smokeless powder solvent but which are non-solvents for the smokeless power include methanol, ethanol, propanol, isopropanol, butanol, isobutanol, and the like. Mixtures of two or more carrier liquids can be employed, if desired.

Solvating solutions are prepared by admixing of the smokeless powder solvent and carrier liquid. The solvating solution composition allows for controlled solvation of a granular smokeless powder mass without its agglomerating or sticking. The solvating solutions are comprised of from about 15% to about 65% by weight of solvent and from about 85% to about 35% of carrier liquid based on the weight of the solvating solution. The preferred compositional range for the solvating solution is from about 25% to about 50% of solvent and from about 75% to about 50% of carrier liquid.

The amount of solvating solution employed should be sufficient to uniformly wet the smokeless powder granules and to provide for surface softening of the granules. Suitable weight ratios of solvating solution to smokeless powder are about 0.5/1.0 and above. While smaller amounts of solvating solution can be employed, it becomes difficult to ensure that each granule is uniformly wetted using smaller amounts. In order to achieve uniform softening it is generally preferred to completely cover the smokeless powder granules with solvating solution. The contact time of the smokeless powder with the solvating solution, when the smokeless granules are completely covered with solvating solution, will vary from about 5 seconds to about 2 minutes, depending on the solvent employed, the concentration of the solvent in the solvating solution, and the size of the individual smokeless powder granules. Longer contact times are required when employing solvating solutions containing low percentages of solvent, and when employing larger size smokeless powder granules.

Following the wetting of the smokeless powder granules, the solvent solution is drained from the granules. The wetted smokeless powder granules are then charged to a mold of the desired configuration and compressed. In an alternative wetting method, the granules can be charged directly to a mold, covered with solvating solution, and compressed. Solvating solution is driven out of the mold during compression.

The compression pressure required to form a caseless cartridge is that needed to provide good contact between the solvent wet smokeless powder granules. A preferred pressure range is, however, from about 500 p.s.i. to about 3000 p.s.i. Pressures as high as 13,000 p.s.i. have been utilized without adverse effect on the granules comprising the caseless cartridge. The time at which the granules must be held under this compression pressure is on the order of seconds, about ten seconds being satisfactory when operating within the preferred pressure range. Longer compression times are required at pressures less than 500 p.s.i.

Following compression of the smokeless powder granules the pressure is released and the resulting cartridge of agglomerated smokeless powder granules is removed from the mold. This cartridge is dried to remove any solvating solution which may be adhering to the cartridge. The cartridge can be heated at a temperature of from about 120° F. to about 160° F. to aid in the removal of the solvating solution. The time required for removal of the solvents will vary with the volatility of the components comprising the solvating solution but in general, will be from about 24 hours to about 96 hours.

The dried caseless cartridge recovered following the process of this invention is hard and strong. The cartridge can be contour machined, if desired, to fit any appropriate gun chamber, or it can be used directly without machining if made in an appropriate size mold. Caseless cartridges can be made by the method of this invention for very large weapons since fabrication of the cartridge is dependent on solvation of the smokeless powder by the solvating solution rather than on compression pressure. Only sufficient compression pressure to cause good granule contact is required.

The following example further illustrates this invention. All parts and percentages are by weight unless otherwise specified.

Example 1 illustrates the high physical strength of caseless cartridges molded by the process of this invention.

EXAMPLE 1

About 100 parts of smokeless powder containing 91% nitrocellulose is charged to a mold. A solvating solution comprised of 40 parts of acetone and 60 parts of ethanol is prepared. The solvating solution is added to the mold and completely covers the smokeless powder granules. The granules are molded at about 1500 p.s.i. Solvent is driven from the mold during compression. Total contact time of propellant granules and the solvating solution is about one minute. The resulting cartridge is dried at 140° F. to remove all traces of solvating solution.

The above preparation of a caseless cartridge is repeated, three times, the only change in the process being that aqueous solvating solutions of varying compositions are employed in place of the non-aqueous solvating solution of this invention.

The solvating solution compositions, and compression and tensile strengths resulting from physical testing of the caseless cartridges produced are compared in Table I.

TABLE I

| Solvating solution composition | Non-aqueous | Aqueous 1 | Aqueous 2 | Aqueous 3 |
|---|---|---|---|---|
| Acetone, percent | 40 | 40 | 40 | 40 |
| Alcohol, percent | 60 | 0 | 20 | 40 |
| Water, percent | 0 | 60 | 40 | 20 |
| Compression strength, p.s.i. | 4,987 | 592 | 520 | 192 |
| Tensile strength, p.s.i. | 1,010 | 28 | 21 | 4 |

From the results of the above tests the physical strength superiority of the propellant charge prepared by the process employing the non-aqueous solvating solution of this invention is clearly demonstrated. Compression strength is increased about 840% and tensile strength is increased about 3600% for the caseless cartridge produced employing the process of this invention.

The following examples are used to illustrate ballistic results obtained from firing caseless ammunition wherein the caseless cartridge is prepared by the process of this invention.

EXAMPLES 2-7

Caseless cartridges are prepared by molding of double base smokeless powder granules employing the process conditions set forth in Example 1. The solvating solution employed consists of 40% acetone and 60% ethanol. Two different smokeless powder compositions are used. Caseless cartridges are prepared to fit 5.56 mm., 7.62 mm., 20 mm., and 26.6 mm. weapons. The caseless cartridges are assembled with bullets and conditioned for test firing. Table II contains the data on the assembled caseless ammunition, and test firing conditions.

TABLE II

| Ex. | Weapon, mm. | Test temperature,° F | Smokeless composition | Caseless cartridge, average weight | Bullet, average weight |
|---|---|---|---|---|---|
| 2 | 5.56 | +70 | A | 25.5 grains | 55.0 grains. |
| 3 | | −65 | A | do | Do. |
| 4 | 7.62 | +70 | B | 42.0 grains | 150.0 grains. |
| 5 | | −65 | B | do | Do. |
| 6 | 20.00 | +70 | B | 730.2 grains | 1,528.3 grains. |
| 7 | 26.6 | +70 | B | 115.0 grams | 148 grams. |

NOTE.—Composition A: 84.15% Nitrocellulose, 15.0% Nitroglycerin, 0.85% Potassium Nitrate. Composition B: 91.0% Nitrocellulose, 7.0% Nitroglycerin 1.0% Potassium Nitrate, 0.75% Diphenyl amine 0.25% Moisture and Volatiles. These granules are coated with 5% by weight of ethyl cellulose and graphite glazed.

Ballistic data from firing of the caseless ammunition of Examples 2-7 indicate good ballistic reproducibility. There are no cartridge failures from any of the tests conducted. Ballistics are reproducible for rounds conditioned to −65° F. prior to firing, illustrating no break-up of individual granules even at this temperature.

Table III illustrates muzzle velocities recorded from test firing of the caseless ammunition specified in Table II. Chamber pressures are recorded for Example 6. These ballistic data are substantially the same as if a charge of individual smokeless powder granules were employed illustrating good break-up of the cartridge on firing into individual granules of smokeless powder. The integrity of the individual granules of smokeless powder is also illustrated by the fact that no excessive pressures were recorded in any of these tests.

TABLE III

| Muzzle velocity (feet per second) | Round 1 | 2 | 3 | 4 | 5 | 6 | 7 | 8 | 9 | 10 |
|---|---|---|---|---|---|---|---|---|---|---|
| Example: | | | | | | | | | | |
| 2 | 3,236 | 3,200 | 3,332 | 3,210 | 3,175 | 3,130 | 3,160 | | | |
| 3 | 3,160 | 3,160 | 3,057 | 2,998 | | | | | | |
| 4 | 2,816 | 2,286 | 2,828 | 2,820 | 2,860 | 2,852 | 2,816 | 2,886 | 2,864 | 2,816 |
| 5 | 2,652 | 2,728 | 2,492 | 2,628 | 2,616 | 2,630 | | | | |
| 6 | 3,652 | 3,674 | 3,687 | 3,647 | | | | | | |
| 7 | 3,863 | 3,794 | 3,851 | 3,874 | 4,007 | 3,992 | 3,894 | | | |
| Chamber Pressure* (pounds per square inch) Example 6 | 50,300 | 50,300 | 52,500 | 51,000 | | | | | | |

\* Measurement by Copper Crusher Guage.

The smokeless powder compositions which can be employed to form caseless cartridges include single base, double base, and triple base compositions.

By the term "smokeless powder" it is meant herein, the well-known colloided nitrocellulose powders, the nitrocellulose in all events being characterized by a nitrogen content of at least about 11.3 weight percent, generally in the range of from about 12-13.5 percent, and being in colloided form. As is well known the single base powder contains colloided nitrocellulose as the chief component, say in the order of from about 85 to 99 weight percent and the double base powder contains the same colloided nitrocellulose component but together with nitroglycerin or an equivalent liquid explosive nitric ester. Double base powders contain generally, at least, one-third colloided nitrocellulose and substantially the remainder nitroglycerin, with, of course, the usual supplemental ingredients. Triple base powders contain nitroguanidine in addition to the colloided nitrocellulose, and nitroglycerin, in proportions generally, at least, about 40 to 50 percent nitroguanidine and substantially as the remainder colloided nitrocellulose and nitroglycerin, the latter two being in any suitable relative proportions, for example, 1:1, to 4:1 of nitrocellulose to nitroglycerin. Minor amounts of supplemental ingredients can be utilized in these powders, particularly stabilizing agents, gelation agents, oxidizer salts in some instances, DNT oil and the like, all of which are well-known in the art.

The term "smokeless powder granules" as used herein, is intended to include any shape or form of small particle of smokeless powder such as flakes, strips, pellets, cylindrical grains and the like.

The caseless cartridges produced in accordance with the method of this invention have the same composition as the smokeless powder from which they are prepared, the solvating solution employed being removed during molding and by drying. The individual smokeless powder granules are glued together when their surfaces, softened by the solvating solution, are pressed together during the molding operation. The use of the non-aqueous carrier liquid prevents an excessive amount of softening. Sufficient solvent action does take place, however, to give a resulting cartridge of agglomerated smokeless powder having high strength, yet capable of breaking-up, and burning as individual smokeless powder granules when ignited. Break-up of the cartridges into individual smokeless powder granules is necessary in order that the ballistics of caseless ammunition are substantially the same as those of case-type ammunition.

As will be evident to those skilled in the art, various modifications can be made or followed, in the light of the foregoing disclosure and discussion without departing from the spirit or scope of the disclosure, or scope of the claims.

What I claim and desire to protect by Letters Patent is:

1. A method for making caseless cartridges from smokeless powder which comprises
    (a) wetting smokeless powder granules with a solvating solution comprised of a solvent for smokeless powder selected from the group consisting of acetone, methyl ethyl ketone, isopropyl methyl ketone, diethyl ketone, propyl methyl ketone, isobutyl methyl ketone, and mixtures thereof, and a non-aqueous carrier liquid, said non-aqueous carrier liquid selected from the group consisting of methanol, ethanol, propanol, isopropanol, butanol, isobutanol, and mixtures thereof,
    (b) compressing the wetted smokeless powder granules to effect granule contact whereby an agglomeration of smokeless powder granules is formed,
    (c) drying the agglomeration of smokeless powder granules to remove solvating solution and,
    (d) recovering a caseless cartridge.

2. The method of claim 1, in which the solvating solution is comprised by weight of from about 15% to about 65% of solvent and from 85% to about 35% non-aqueous carrier liquid.

3. The method of claim 2, wherein the solvent is acetone and the non-aqueous carrier liquid is ethanol.

4. The method of claim 2, wherein the solvent is acetone and the non-aqueous carrier liquid is methanol.

5. The method of claim 2, wherein the solvent is methyl ethyl ketone and the non-aqueous carrier liquid is ethanol.

6. The method of claim 3, in which the smokeless powder granules are of a single base type formulation.

7. The method of claim 3, in which the smokeless powder granules are of a double base type formulation.

8. The method of claim 3, in which the smokeless powder granules are of a triple base type formulation.

9. The method of claim 7, in which the wetted smokeless powder granules are compressed at a pressure of from about 500 p.s.i. to about 3000 p.s.i.

10. A method for making caseless cartridges from smokeless powder comprising
    (a) covering the smokeless powder granules with a solvating solution for from about 5 seconds to about 2 minutes, said solvating solution being comprised of a solvent for smokeless powder selected from the group consisting of acetone, methyl ethyl ketone, isopropyl methyl ketone, diethyl ketone, propyl methyl ketone, isobutyl methyl ketone and mixtures thereof, and a non-aqueous carrier liquid selected from the group consisting of methanol, ethanol, propanol, isopropanol, butanol, isobutanol, and mixtures thereof,
    (b) compressing the wetted smokeless powder granules to effect granule contact whereby an agglomeration of smokeless powder granules is formed,
    (c) drying the agglomeration of smokeless powder granules, and
    (d) recovering a caseless cartridge.

11. The method of claim 10, wherein the solvent is acetone and the non-aqueous carrier liquid is ethanol.

12. The method of claim 10, wherein the solvent is methyl ethyl ketone and the non-aqueous carrier liquid is ethanol.

References Cited
UNITED STATES PATENTS

| | | | |
|---|---|---|---|
| 3,260,203 | 7/1966 | Godfrey et al. | 149—2X |
| 3,264,993 | 8/1966 | De Fries et al. | 149—2X |
| 3,280,746 | 10/1966 | Brown | 149—2X |
| 3,353,438 | 11/1967 | Scanlon et al. | 264—3X |
| 3,447,983 | 6/1969 | Camp et al. | 264—3X |
| 3,463,086 | 8/1969 | Silva et al. | 149—2X |

LELAND A. SEBASTIAN, Primary Examiner

S. J. LECHERT, JR., Assistant Examiner

U.S. Cl. X.R.

102—38; 149—2, 96, 97